United States Patent
Keith, Jr.

(10) Patent No.: US 9,906,418 B2
(45) Date of Patent: *Feb. 27, 2018

(54) APPLICATIONS AND SERVICES AS A BUNDLE

(71) Applicant: Microsoft Technology Licensing, LLC, Redmond, WA (US)

(72) Inventor: Robert O. Keith, Jr., Modesto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/521,165

(22) Filed: Oct. 22, 2014

(65) Prior Publication Data

US 2015/0046523 A1 Feb. 12, 2015

Related U.S. Application Data (63) Continuation of application No. 11/440,505, filed on May 24, 2006, now Pat. No. 8,898,319.

(51) Int. Cl.
*H04L 12/24* (2006.01)
*H04L 29/08* (2006.01)
(Continued)

(52) U.S. Cl.
CPC ...... *H04L 41/5096* (2013.01); *G06F 3/04842* (2013.01); *G06F 3/04847* (2013.01);
(Continued)

(58) Field of Classification Search
CPC ... H04L 67/02; H04L 67/306; H04L 67/2838; H04L 41/5096; H04L 41/0803; H04L 67/162838; G06F 9/545; G06F 9/547
See application file for complete search history.

(56) References Cited

U.S. PATENT DOCUMENTS

| 4,866,635 A | 9/1989 | Khan et al. |
| 5,204,897 A | 4/1993 | Wyman |

(Continued)

FOREIGN PATENT DOCUMENTS

| WO | WO2005119493 A2 | 12/2005 |
| WO | WO2005119494 A2 | 12/2005 |

(Continued)

OTHER PUBLICATIONS

IBM Corporation, AFS:"User Guide", First Edition, Version 3.6. Apr. 2000, pp. 112.

(Continued)

*Primary Examiner* — Ramy M Osman
(74) *Attorney, Agent, or Firm* — Workman Nydegger (57) ABSTRACT

A system and method are provided for managing bundles of applications and services over a network between a server system and client computers. Related applications and services are bundled together in one package so that a user is able to quickly and easily configure a computer to perform a specified task. By combining both the applications and the services in one bundle, users no longer have to search the Internet for necessary components. Furthermore, additional features that allow portability of the bundled applications and services in addition to diagnostic monitoring are included.

25 Claims, 6 Drawing Sheets

(51) Int. Cl.
*G06F 3/0484* (2013.01)
*H04L 12/26* (2006.01)
*H04L 29/06* (2006.01)

(52) U.S. Cl.
CPC ...... *H04L 41/0806* (2013.01); *H04L 43/0823* (2013.01); *H04L 67/02* (2013.01); *H04L 67/16* (2013.01); *H04L 67/2838* (2013.01); *H04L 67/306* (2013.01); *H04L 67/42* (2013.01)

(56) References Cited

U.S. PATENT DOCUMENTS

| | | |
|---|---|---|
| 5,602,990 A | 2/1997 | Leete |
| 5,649,196 A | 7/1997 | Woodhill et al. |
| 5,659,743 A | 8/1997 | Adams et al. |
| 5,787,409 A | 7/1998 | Seiffert et al. |
| 5,802,364 A | 9/1998 | Senator et al. |
| 5,812,751 A | 9/1998 | Ekrot et al. |
| 5,818,438 A | 10/1998 | Howe et al. |
| 5,835,911 A | 11/1998 | Nakagawa et al. |
| 5,897,635 A | 4/1999 | Torres et al. |
| 5,930,357 A | 7/1999 | Fukui |
| 5,933,647 A | 8/1999 | Aronberg et al. |
| 5,950,010 A | 9/1999 | Hesse et al. |
| 5,974,547 A | 10/1999 | Kilemenko |
| 6,012,152 A | 1/2000 | Douik et al. |
| 6,029,196 A | 2/2000 | Lenz |
| 6,067,582 A | 5/2000 | Smith et al. |
| 6,144,959 A | 11/2000 | Anderson et al. |
| 6,170,065 B1 | 1/2001 | Kobata et al. |
| 6,189,101 B1 | 2/2001 | Dusenbur, Jr. |
| 6,209,089 B1 | 3/2001 | Selitrennikoff et al. |
| 6,212,660 B1 | 4/2001 | Joeressen et al. |
| 6,282,711 B1 | 8/2001 | Halpern et al. |
| 6,292,827 B1 | 9/2001 | Raz et al. |
| 6,301,612 B1 | 10/2001 | Selitrennikoff et al. |
| 6,311,221 B1 | 10/2001 | Raz et al. |
| 6,314,428 B1 | 11/2001 | Brew et al. |
| 6,317,761 B1 | 11/2001 | Landsman et al. |
| 6,349,137 B1 | 2/2002 | Hunt et al. |
| 6,356,915 B1 | 3/2002 | Chtchetkine et al. |
| 6,363,400 B1 | 3/2002 | Chtchetkine et al. |
| 6,366,296 B1 | 4/2002 | Boreczky et al. |
| 6,378,035 B1 | 4/2002 | Parry et al. |
| 6,339,826 B2 | 6/2002 | Hayes, Jr. et al. |
| 6,421,777 B1 | 7/2002 | Pierre-Louis et al. |
| 6,449,658 B1 | 9/2002 | Lafe et al. |
| 6,459,499 B1 | 10/2002 | Tomat |
| 6,463,530 B1 | 10/2002 | Sposato |
| 6,473,794 B1 | 10/2002 | Guheen et al. |
| 6,477,531 B1 | 11/2002 | Sullivan et al. |
| 6,490,677 B1 | 12/2002 | Aguilar et al. |
| 6,536,037 B1 | 3/2003 | Guheen et al. |
| 6,553,375 B1 | 4/2003 | Huang et al. |
| 6,556,950 B1 | 4/2003 | Schwenke et al. |
| 6,574,618 B2 | 6/2003 | Eylon et al. |
| 6,578,142 B1 | 6/2003 | Anderson et al. |
| 6,606,744 B1 | 8/2003 | Mikurak |
| 6,625,651 B1 | 9/2003 | Swartz et al. |
| 6,625,754 B1 | 9/2003 | Aguilar et al. |
| 6,633,782 B1 | 10/2003 | Schleiss et al. |
| 6,636,857 B2 | 10/2003 | Thomas et al. |
| 6,654,797 B1 | 11/2003 | Kamper |
| 6,654,801 B2 | 11/2003 | Mann et al. |
| 6,694,375 B1 | 2/2004 | Beddus et al. |
| 6,697,852 B1 | 2/2004 | Ryu |
| 6,704,886 B1 | 3/2004 | Gill et al. |
| 6,718,464 B2 | 4/2004 | Cromer et al. |
| 6,728,530 B1 | 4/2004 | Heinonen et al. |
| 6,735,625 B1 | 5/2004 | Ponna |
| 6,751,658 B1 | 6/2004 | Haun et al. |
| 6,757,729 B1 | 6/2004 | Devarakonda et al. |
| 6,757,894 B2 | 6/2004 | Eylon et al. |
| 6,769,127 B1 | 7/2004 | Bonomi et al. |
| 6,795,912 B1 | 9/2004 | Itoh et al. |
| 6,816,462 B1 | 11/2004 | Booth, III et al. |
| 6,816,882 B1 | 11/2004 | Conner et al. |
| 6,820,180 B2 | 11/2004 | McBrearty et al. |
| 6,854,009 B1 | 2/2005 | Hughes |
| 6,871,210 B1 | 3/2005 | Subramanian |
| 6,880,108 B1 | 4/2005 | Gusler et al. |
| 6,885,481 B1 | 4/2005 | Dawe |
| 6,886,020 B1 | 4/2005 | Zahavi |
| 6,898,286 B2 | 5/2005 | Murray |
| 6,915,343 B1 | 7/2005 | Brewer et al. |
| 6,954,853 B2 | 10/2005 | Wang et al. |
| 6,954,930 B2 | 10/2005 | Drake et al. |
| 6,959,235 B1 | 10/2005 | Abdel-Malek et al. |
| 6,985,967 B1 | 1/2006 | Hipp |
| 7,003,560 B1 | 2/2006 | Mullen et al. |
| 7,003,663 B2 | 2/2006 | Logosanto et al. |
| 7,024,471 B2 | 4/2006 | George et al. |
| 7,058,698 B2 | 6/2006 | Chatterjee et al. |
| 7,080,118 B2 | 7/2006 | Hilderbrand |
| 7,143,307 B1 | 11/2006 | Witte et al. |
| 7,149,698 B2 | 12/2006 | Guheen et al. |
| 7,165,087 B1 | 1/2007 | Graupner et al. |
| 7,175,078 B2 | 2/2007 | Ban et al. |
| 7,178,166 B1 | 2/2007 | Taylor et al. |
| 7,194,445 B2 | 3/2007 | Chan et al. |
| 7,200,779 B1 | 4/2007 | Cross, Jr. et al. |
| 7,210,143 B2 | 4/2007 | Or et al. |
| 7,237,122 B2 | 6/2007 | Kadam et al. |
| 7,260,597 B1 | 8/2007 | Hofrichter et al. |
| 7,287,053 B2 | 10/2007 | Bodin |
| 7,305,671 B2 | 12/2007 | Davidov et al. |
| 7,328,367 B2 | 2/2008 | Ukai et al. |
| 7,330,997 B1 | 2/2008 | Odom |
| 7,337,311 B2 | 2/2008 | Chen et al. |
| 7,392,046 B2 | 6/2008 | Leib et al. |
| 7,401,125 B1 | 7/2008 | Uchida et al. |
| 7,464,163 B1 | 12/2008 | Bantz et al. |
| 7,480,822 B1 | 1/2009 | Arbon et al. |
| 7,487,383 B2 | 2/2009 | Bensinger |
| 7,512,584 B2 * | 3/2009 | Keith, Jr. ............... G06N 5/04 706/45 |
| 7,571,467 B1 | 8/2009 | Priestley et al. |
| 7,577,431 B2 | 8/2009 | Jiang |
| 7,624,086 B2 | 11/2009 | Keith, Jr. |
| 7,627,694 B2 | 12/2009 | Sreenivasan et al. |
| 7,664,834 B2 | 2/2010 | Keith, Jr. |
| 7,698,487 B2 | 4/2010 | Rothman et al. |
| 7,703,142 B1 | 4/2010 | Wilson et al. |
| 7,752,486 B2 | 7/2010 | Satran et al. |
| 7,788,524 B2 | 8/2010 | Wing et al. |
| 7,840,514 B2 | 11/2010 | Keith, Jr. |
| 7,844,686 B1 | 11/2010 | Keith, Jr. |
| 7,886,031 B1 * | 2/2011 | Taylor et al. ............... 709/221 |
| 7,908,339 B2 | 3/2011 | Keith, Jr. |
| 7,912,902 B2 | 3/2011 | Cheng et al. |
| 8,099,378 B2 | 1/2012 | Keith, Jr. |
| 8,126,722 B2 | 2/2012 | Robb et al. |
| 8,175,418 B1 | 5/2012 | Keith, Jr. |
| 8,234,238 B2 | 7/2012 | Keith, Jr. |
| 8,244,864 B1 | 8/2012 | Bahl et al. |
| 8,307,239 B1 | 11/2012 | Keith, Jr. |
| 8,423,821 B1 | 4/2013 | Keith, Jr. |
| 2001/0034736 A1 | 10/2001 | Eylon et al. |
| 2001/0037323 A1 | 11/2001 | Moulton et al. |
| 2001/0037399 A1 | 11/2001 | Eylon et al. |
| 2001/0037400 A1 | 11/2001 | Raz et al. |
| 2001/0044850 A1 | 11/2001 | Raz et al. |
| 2001/0049793 A1 | 12/2001 | Sugimoto |
| 2002/0007418 A1 | 1/2002 | Hegde et al. |
| 2002/0013827 A1 | 1/2002 | Edstrom et al. |
| 2002/0035674 A1 | 3/2002 | Vetrivelkumaran et al. |
| 2002/0042833 A1 | 4/2002 | Hendler et al. |
| 2002/0049764 A1 | 4/2002 | Boothby et al. |
| 2002/0059505 A1 | 5/2002 | St Pierre et al. |
| 2002/0083183 A1 | 6/2002 | Pujare et al. |
| 2002/0087625 A1 | 7/2002 | Toll et al. |
| 2002/0087717 A1 | 7/2002 | Artzi et al. |
| 2002/0087883 A1 | 7/2002 | Wohlgemuth et al. |
| 2002/0087963 A1 | 7/2002 | Eylon et al. |

(56) References Cited

U.S. PATENT DOCUMENTS

| | | |
|---|---|---|
| 2002/0091763 A1 | 7/2002 | Shah et al. |
| 2002/0094868 A1 | 7/2002 | Tuck et al. |
| 2002/0099934 A1 | 7/2002 | Cromer et al. |
| 2002/0104080 A1 | 8/2002 | Woodard et al. |
| 2002/0107920 A1 | 8/2002 | Hotti |
| 2002/0107945 A1 | 8/2002 | George et al. |
| 2002/0116585 A1 | 8/2002 | Scherr |
| 2002/0124092 A1 | 9/2002 | Urien |
| 2002/0129089 A1 | 9/2002 | Hegde et al. |
| 2002/0131404 A1 | 9/2002 | Mehta et al. |
| 2002/0138640 A1 | 9/2002 | Raz et al. |
| 2002/0157089 A1 | 10/2002 | Patel et al. |
| 2002/0161868 A1 | 10/2002 | Paul et al. |
| 2002/0161908 A1 | 10/2002 | Benitez et al. |
| 2002/0169797 A1 | 11/2002 | Hedge et al. |
| 2002/0188941 A1 | 12/2002 | Cicciarelli et al. |
| 2003/0004882 A1 | 1/2003 | Holler et al. |
| 2003/0005096 A1 | 1/2003 | Paul et al. |
| 2003/0009538 A1 | 1/2003 | Shah et al. |
| 2003/0014470 A1 | 1/2003 | Iijima |
| 2003/0031164 A1 | 2/2003 | Nabkel et al. |
| 2003/0033379 A1 | 2/2003 | Civanlar et al. |
| 2003/0036882 A1 | 2/2003 | Harper et al. |
| 2003/0037328 A1 | 2/2003 | Cicciarelli et al. |
| 2003/0041136 A1 | 2/2003 | Cheline et al. |
| 2003/0046371 A1 | 3/2003 | Falkner |
| 2003/0051128 A1 | 3/2003 | Rodriguez et al. |
| 2003/0055878 A1 | 3/2003 | Fletcher et al. |
| 2003/0061067 A1 | 3/2003 | Atwal et al. |
| 2003/0078960 A1 | 4/2003 | Murrren et al. |
| 2003/0110188 A1 | 6/2003 | Howard et al. |
| 2003/0120502 A1* | 6/2003 | Robb et al. ............ 705/1 |
| 2003/0121051 A1 | 6/2003 | Howe et al. |
| 2003/0126242 A1 | 7/2003 | Chang |
| 2003/0140160 A1 | 7/2003 | Raz et al. |
| 2003/0177381 A1 | 9/2003 | Ofek et al. |
| 2003/0191730 A1 | 10/2003 | Adkins et al. |
| 2003/0204562 A1 | 10/2003 | Hwang |
| 2003/0233383 A1 | 12/2003 | Kosimies |
| 2003/0233493 A1 | 12/2003 | Boldon et al. |
| 2004/0010716 A1 | 1/2004 | Childress et al. |
| 2004/0019666 A1* | 1/2004 | Daase ............ H04L 41/0803 709/221 |
| 2004/0025018 A1 | 2/2004 | Haas et al. |
| 2004/0068554 A1 | 4/2004 | Bales et al. |
| 2004/0073787 A1 | 4/2004 | Ban et al. |
| 2004/0093492 A1 | 5/2004 | Daude et al. |
| 2004/0098426 A1 | 5/2004 | Ishii et al. |
| 2004/0104927 A1 | 6/2004 | Husain et al. |
| 2004/0107273 A1 | 6/2004 | Biran et al. |
| 2004/0123153 A1 | 6/2004 | Wright et al. |
| 2004/0128346 A1 | 6/2004 | Melamed et al. |
| 2004/0148306 A1 | 7/2004 | Moulton et al. |
| 2004/0180721 A1 | 9/2004 | Rowe |
| 2004/0193876 A1 | 9/2004 | Donley et al. |
| 2004/0201604 A1 | 10/2004 | Kraenzel et al. |
| 2004/0236843 A1 | 11/2004 | Wing et al. |
| 2004/0243650 A1 | 12/2004 | McCrory et al. |
| 2004/0243928 A1 | 12/2004 | Hesmer et al. |
| 2004/0267944 A1 | 12/2004 | Britt, Jr. |
| 2005/0027846 A1 | 2/2005 | Wolfe et al. |
| 2005/0033757 A1 | 2/2005 | Greenblatt et al. |
| 2005/0033808 A1 | 2/2005 | Cheng et al. |
| 2005/0044197 A1 | 2/2005 | Lai |
| 2005/0044332 A1 | 2/2005 | de Brebisson |
| 2005/0044544 A1 | 2/2005 | Slivka et al. |
| 2005/0060281 A1 | 3/2005 | Bucher et al. |
| 2005/0071267 A1 | 3/2005 | Takahashi et al. |
| 2005/0096920 A1 | 5/2005 | Matz et al. |
| 2005/0108297 A1 | 5/2005 | Rollin et al. |
| 2005/0108546 A1 | 5/2005 | Lehew et al. |
| 2005/0108593 A1 | 5/2005 | Purshothaman et al. |
| 2005/0125461 A1* | 6/2005 | Filz ............ H04L 67/1097 |
| 2005/0144218 A1 | 6/2005 | Heintz |
| 2005/0149729 A1 | 7/2005 | Zimmer et al. |
| 2005/0160289 A1 | 7/2005 | Shay |
| 2005/0188315 A1 | 8/2005 | Campbell et al. |
| 2005/0192035 A1 | 9/2005 | Jiang |
| 2005/0192099 A1* | 9/2005 | Nguyen ............ H04L 67/38 463/42 |
| 2005/0193245 A1 | 9/2005 | Hayden et al. |
| 2005/0198196 A1 | 9/2005 | Bohn et al. |
| 2005/0198239 A1 | 9/2005 | Hughes |
| 2005/0216524 A1 | 9/2005 | Gomes et al. |
| 2005/0216902 A1 | 9/2005 | Schaefer |
| 2005/0226059 A1 | 10/2005 | Kavuri et al. |
| 2005/0256952 A1 | 11/2005 | Mouhanna et al. |
| 2005/0262503 A1 | 11/2005 | Kane |
| 2005/0268145 A1 | 12/2005 | Hufferd et al. |
| 2005/0273486 A1 | 12/2005 | Keith, Jr. |
| 2005/0283606 A1 | 12/2005 | Williams |
| 2005/0286435 A1 | 12/2005 | Ogawa et al. |
| 2006/0021040 A1 | 1/2006 | Boulanger et al. |
| 2006/0031377 A1 | 2/2006 | Ng et al. |
| 2006/0031407 A1 | 2/2006 | Dispensa et al. |
| 2006/0031529 A1 | 2/2006 | Keith, Jr. |
| 2006/0035713 A1 | 2/2006 | Cockerille et al. |
| 2006/0041641 A1 | 2/2006 | Breiter et al. |
| 2006/0041759 A1 | 2/2006 | Kaliski, Jr. et al. |
| 2006/0233310 A1 | 2/2006 | Adams, Jr. et al. |
| 2006/0047716 A1 | 3/2006 | Keith, Jr. |
| 2006/0047946 A1 | 3/2006 | Keith, Jr. |
| 2006/0059384 A1 | 3/2006 | Helliker |
| 2006/0074943 A1 | 4/2006 | Nakano et al. |
| 2006/0077967 A1 | 4/2006 | Sienel et al. |
| 2006/0095705 A1 | 5/2006 | Wichelman et al. |
| 2006/0106896 A1 | 5/2006 | Carlson et al. |
| 2006/0224544 A1 | 5/2006 | Wichelman et al. |
| 2006/0129459 A1 | 6/2006 | Mendelsohn |
| 2006/0143709 A1 | 6/2006 | Brooks et al. |
| 2006/0149955 A1 | 7/2006 | Velhal et al. |
| 2006/0179061 A1 | 8/2006 | D'Souza et al. |
| 2006/0224545 A1 | 10/2006 | Keith, Jr. |
| 2007/0011292 A1 | 1/2007 | Fristch et al. |
| 2007/0078982 A1 | 4/2007 | Aidun et al. |
| 2007/0094269 A1 | 4/2007 | Mikesell et al. |
| 2007/0143374 A1 | 6/2007 | D'Souza et al. |
| 2007/0174658 A1 | 7/2007 | Takamoto et al. |
| 2007/0174690 A1 | 7/2007 | Kambara et al. |
| 2007/0185936 A1 | 8/2007 | Derk et al. |
| 2007/0233633 A1 | 10/2007 | Keith, Jr. |
| 2007/0239905 A1 | 10/2007 | Banerjee et al. |
| 2007/0255604 A1 | 11/2007 | Seelig |
| 2007/0271290 A1 | 11/2007 | Keith, Jr. |
| 2007/0271428 A1 | 11/2007 | Atluri |
| 2007/0274315 A1 | 11/2007 | Keith, Jr. |
| 2007/0276836 A1 | 11/2007 | Chatterjee et al. |
| 2008/0016387 A1 | 1/2008 | Bensinger |
| 2008/0034019 A1 | 2/2008 | Cisler et al. |
| 2008/0034071 A1 | 2/2008 | Wilkinson et al. |
| 2008/0072002 A1 | 3/2008 | Kuwahara et al. |
| 2008/0077622 A1 | 3/2008 | Keith, Jr. |
| 2008/0077630 A1 | 3/2008 | Keith, Jr. |
| 2008/0127294 A1 | 5/2008 | Keith, Jr. |
| 2008/0209142 A1 | 8/2008 | Obernuefemann |
| 2008/0216168 A1 | 9/2008 | Larson et al. |
| 2008/0294860 A1 | 11/2008 | Stakutis et al. |
| 2008/0313632 A1 | 12/2008 | Kumar et al. |
| 2009/0075593 A1 | 3/2009 | Demirbasa et al. |
| 2009/0094362 A1 | 4/2009 | Huff |
| 2010/0050011 A1 | 2/2010 | Takamoto et al. |
| 2010/0125770 A1 | 5/2010 | Keith, Jr. |
| 2011/0047118 A1 | 2/2011 | Keith, Jr. |
| 2011/0161729 A1 | 6/2011 | Ritz et al. |
| 2012/0198154 A1 | 8/2012 | Keith, Jr. |
| 2012/0272099 A1 | 10/2012 | Keith, Jr. |
| 2013/0031405 A1 | 1/2013 | Keith, Jr. |

(56) References Cited

U.S. PATENT DOCUMENTS

| | | | |
|---|---|---|---|
| 2013/0204974 A1* | 8/2013 | Keith, Jr. | ............ H04L 67/2838 709/219 |
| 2015/0046522 A1 | 2/2015 | Keith et al. | |

FOREIGN PATENT DOCUMENTS

| | | |
|---|---|---|
| WO | WO2005119495 A2 | 12/2005 |
| WO | WO2006010131 A2 | 1/2006 |
| WO | WO2006094282 A2 | 9/2006 |
| WO | WO2006094301 A2 | 9/2006 |
| WO | WO2007139962 A2 | 12/2007 |
| WO | WO2007139963 A2 | 12/2007 |
| WO | WO2008039386 A2 | 4/2008 |
| WO | WO2008039394 A2 | 4/2008 |
| WO | WO2008039395 A2 | 4/2008 |

OTHER PUBLICATIONS http://www.swapdrive.com/sdbackup.asp.
http://www.backup.com.
VMWARE,Using VMware Infrastructure for Backup and Restore, Oct. 26, 2006, http;/www.vmware.com/resource/techresources/ , pp. 1-20.
VMWARE,VMware Infrastructure Architecture Overview, Jun. 14, 2006, http;/www.vmware.com/resource/techresources/ , pp. 1-14.
IEEE100 The Authoritative Dictionary of IEEE Standards Terms, Seventh Edition, Jan. 2003. 3 pages.
Microsoft@ Computer Dictionary, Fifth Edition, 2002, 3 pages.
MacDonald, J.P., "File System Support for Delta Compression," University of California at Berkeley, Dept. of Electrical Engineering and Computer Sciences, May 19, 2000, 32 pages.
Tridgell, A., "Efficient Algorithms for Sorting and Synchronization," Thesis, The Australian National University, Feb. 1999, 106 pages.
Random House Unabridged Dictionary, "device: meaning and definitions," 1997, RandomHouse Inc., retrieved via "http://dictionary.infoplease.com/device."
http://en.wikipedia.org/wik/Expert system, pp. 1-9.
http://.pctools.com/registry-mechanic/.pp. 1-2.
http:/www.stealthbits.com/,pp. 1-2.
http://macrovision.com/products/flexnet_intallshield/installshield/index.shtml, pp. 1-2.
http://macrovision.com/products/flexnet_intallshield/installshield/overview/index.shtml, pp. 1-3.
http://www.microsoft.com/technet/prodtechnol/windows2000serv/maintain/featsability/inmnwp.mspx, pp. 1-36.
Muthitacharoen et al., "A Low-bandwidth Network File System," MIT Laboratory for Computer Science and NYU Department of Computer Science, 2001, 14 pages.
Shepler et al. "RFC 3530—Network File System (NFS) version 4 Protocol"/ Standards Track, Apr. 2003, pp. 278, http://tools.ieff.org/html/rfc3530#page-119.
Cisco PIX"Configuring an IPSec Tunnel Between a Cisco Secure PIX Firewall and a Checkpoint NG Firewall." May 12, 2006, document ID 23785.
Yu et al.,"Scalable network resource managemant for large scale Virtual Private Networks," Stimulation Modeling Practice and Theory, 12(2004) pp. 263-285.
Bandwidth Capping at Source http;//www..24onlinebilling.comdownload/whitepapers/Bandwidth%20Capping%20At%20Source.pdf pp. 1-9.
Microsoft Press, Microsoft® Computer Dictionary, Fifth Edition, May 1, 2002, p. 39.
Definition of Plug-in (computing) from http://en.wikipedia.org/wiki/Plug-in_(computing), printed on Jun. 8, 2011,1 page.
Plug-in definition from Wikipedia, http://en.wikipedia.org/wiki/Plug-in_(computing), printed Nov. 6, 2011, 5 pages.
Definition of background processing, IEEE 100, The Authorative Dictionary of IEEE Standards Terms, 7th Edition, 2000, 3 pages.
"Final Office Action Issued in U.S. Appl. No. 14/521,137", dated Nov. 6, 2015, 8 Pages.
Office Action issued in U.S. Appl. No. 14/521,137 dated May 20, 2015.
Office Action issued in U.S. Appl. No. 14/521,137 dated Sep. 28, 2016.
Office Action dated Jun. 30, 2017 cited in U.S. Appl. No. 14/521,137.
Notice of Allowance cited in U.S. Appl. No. 14/521,137 dated Nov. 8, 2017.

* cited by examiner

APPLICATIONS AND SERVICES AS A BUNDLE

RELATED APPLICATION(S)

The present application is a continuation of U.S. patent application Ser. No. 11/440,505, filed May 24, 2006, and entitled "APPLICATIONS AND SERVICES AS A BUNDLE," which is hereby incorporated by reference.

This application is related to U.S. patent application Ser. No. 11/440,563, filed on May 24, 2006 and entitled "COMPUTER HARDWARE AND SOFTWARE DIAGNOSTIC AND REPORT SYSTEM" which is hereby incorporated by reference, U.S. patent application Ser. No. 11/368,214, filed on Mar. 2, 2006 and entitled "COMPUTER HARDWARE AND SOFTWARE DIAGNOSTIC AND REPORT SYSTEM" which is hereby incorporated by reference, and which claims priority under 35 U.S.C. § 119(e) of the co-owned U.S. Provisional patent application, Ser. No. 60/658,970, filed Mar. 4, 2005, and entitled "PRE-INSTALL COMPLIANCE AND CENTRAL PROBLEM DISCOVERY SYSTEM." The Provisional Patent Application, Ser. No. 60/658,970, filed Mar. 4, 2005, and entitled "PRE-INSTALL COMPLIANCE AND CENTRAL PROBLEM DISCOVERY SYSTEM" is also hereby incorporated by reference in its entirety.

The following co-owned, U.S. patent application, Ser. No. 11/368,212 filed Mar. 2, 2006 and entitled "PRE-INSTALL COMPLIANCE SYSTEM" is also incorporated by reference.

This application is also related to U.S. patent application Ser. No. 11/440,524, filed on May 24, 2006 and entitled "APPLICATIONS AS A SERVICE" which is hereby incorporated by reference, and U.S. patent application Ser. No. 11/144,263, filed on Jun. 2, 2005 and entitled "VIRTUAL APPLICATION MANAGER" which is hereby incorporated by reference, and which claims priority under 35 U.S.C. § 119(e) of the co-owned U.S. Provisional Patent Application, Ser. No. 60/577,148, filed Jun. 3, 2004, entitled "VIRTUAL MANAGEMENT SYSTEM", which is hereby incorporated by reference. The Patent Application is related to U.S. patent application Ser. No. 11/144,179, filed Jun. 2, 2005 and entitled "TRANSACTION BASED VIRTUAL FILE SYSTEM OPTIMIZED FOR HIGH-LATENCY NETWORK CONNECTIONS," which is herein incorporated by reference in its entirety.

FIELD OF THE INVENTION

The present invention relates to the field of software applications and services. More specifically, the present invention relates to the field of bundling applications and services together.

BACKGROUND OF THE INVENTION

In the past, when someone wanted to make a phone call, they picked up a telephone and made the call. Or if someone wanted to listen to music, they either turned on the radio, tape player or compact disc player. However, nowadays, to make a phone call or listen to music, a person is able to use their computer. Using computers for additional activities does not end with telephones and music. As computing and Internet technology grow, more and more tasks are being transferred to computers.

Although the idea to combine all of these different tasks on one device sounds promising, there are plenty of pitfalls. Standard telephones come fully functional with little setup time. All a user needs to do is contact the phone company to begin the service and then plug the phone cord into a phone jack. After that, the phone should be fully operational. However, setting up a computer to make phone calls requires many different components to be installed correctly, and if any one of them is missing, the phone functionality does not work. For instance, a service must be selected such as Skype™ and the proper software must be downloaded not only for the service, but to allow voice recognition and other features such as echo cancellation to make the phone calling experience enjoyable. Moreover, the correct hardware is needed such as a microphone and speakers. There are many other less apparent components such as sound cards, device drivers and possibly address books that all must be configured properly for the system to function as a phone. This is a lot of components for a person to keep track of. Although users are becoming more computer savvy, there is still a strong need for the process to be simplified for those who do not want to spend a weekend trying to figure out how to turn their computer into a phone or music jukebox.

There are a number of websites that provide services such as Skype™ for telephone services, iTunes® for music services and ofoto.com for photography services, but as described above, these services alone are not all that is required sometimes. Applications are needed to take full advantage of the services. For example, if a user downloads music through iTunes®, but does not have a music player application, the music files are useless. If users have to search throughout the billions of web pages to figure out how to listen to music on their computer, they are likely to be deterred, and thus the growing potential of computers and the Internet is lost.

SUMMARY OF THE INVENTION

A system and method are provided for managing bundles of applications and services over a network between a server system and client computers. Related applications and services are bundled together in one package so that a user is able to quickly and easily configure a computer to perform a specified task. By combining both the applications and the services in one bundle, users no longer have to search the Internet for necessary components. Furthermore, additional features that allow portability of the bundled applications and services in addition to diagnostic monitoring are included.

In one aspect, a method of bundling applications and services comprises gathering one or more applications, gathering one or more services and providing the one or more applications and the one or more services as a bundle, wherein the bundle is accessible on one or more servers and is added to a user profile when selected from a computing device. The profile is accessible from any computing device which has access to the one or more servers. The method further comprises installing the bundle on a computing device. The method further comprises checking a computing device for compatibility errors before the bundle is installed. The method further comprises monitoring a computing device for errors after the bundle is installed. The method further comprises gathering one or more objects to be included within the bundle. The one or more objects are selected from the group consisting of music, video and game files. The one or more objects include data. The bundle is provided based on a licensing scheme. The services provided within the bundle are paid for by an intermediary who is then paid by a user. The bundle does not comprise selectable components. Alternatively, the bundle comprises selectable components. The method further comprises implementing an interface for selecting the components within the bundle. A double-click adds the bundle to the user profile.

In another aspect, a system for utilizing a bundle to install applications and services comprises one or more servers for storing the bundle wherein the bundle contains one or more applications and one or more services and a computing device coupled to the one or more servers for receiving the bundle through a profile. The profile is accessible from any computing device which has access to the one or more servers. The system further comprises a diagnostic system for checking the computing device for compatibility errors before the bundle is installed. The system further comprises a diagnostic system for monitoring the computing device for errors after the bundle is installed. The bundle further comprises one or more objects. The one or more objects are selected from the group consisting of music, video and game files. The one or more objects include data. The system further comprises a licensing scheme for limiting the duration of use of the applications and services within the bundle. The services provided within the bundle are paid for by an intermediary who is then paid by a user. The bundle does not comprise selectable components. Alternatively, the bundle comprises selectable components. The system further comprises an interface implemented for selecting the components within the bundle. A double-click adds the bundle to the profile.

In another aspect, a system for bundling applications and services comprises means for gathering one or more applications, means for gathering one or more services and means for bundling the one or more applications and the one or more services as a unit, wherein the bundle is accessible on one or more servers and is added to a profile when selected from a computing device. The system further comprises means for adding the bundle to the profile. The profile is portable to other computing devices. The system further comprises means for installing the bundle on a computing device. The system further comprises means for checking a computing device for compatibility errors before the bundle is installed. The system further comprises means for monitoring a computing device for errors after the bundle is installed. The system further comprises means for gathering one or more objects to be included within the bundle. The one or more objects are selected from the group consisting of music, video and game files. The one or more objects include data. The bundle is provided based on a licensing scheme. The services provided within the bundle are paid for by an intermediary who is then paid by a user. The bundle does not comprise selectable components. Alternatively, the bundle comprises selectable components. The system further comprises an interface implemented for selecting the components within the bundle. A double-click adds the bundle to a profile.

In yet another aspect, a system for managing one or more bundles of applications and services over a network, the system comprises a client computer including a client environment and a server system including a database, wherein the server system is configured to be connected to the client computer via the network, to store the one or more bundles, to store a user profile including a user environment configuration, and to synchronize the client environment with the user environment configuration. The user profile is portable to other client computers. The system further comprises a diagnostic system for checking the client computer for compatibility errors before the one or more bundles are installed. The system further comprises a diagnostic system for monitoring the client computer for errors after the one or more bundles are installed. The one or more bundles further comprise one or more objects. The one or more objects are selected from the group consisting of music, video and game files. The one or more objects include data. The system further comprises a licensing scheme for limiting the duration of use of the applications and services within the one or more bundles. The services provided within the one or more bundles are paid for by an intermediary who is then paid by a user. The one or more bundles do not comprise selectable components. The one or more bundles comprise selectable components. The system further comprises an interface implemented for selecting the components within the one or more bundles. A double-click adds the one or more bundles to the user profile.

In another aspect, a method for managing one or more bundles of applications and services over a network, wherein the network is configured to be connected to a server system and to a client computer, the method comprises receiving user login information, accessing a user profile associated with the login information, wherein the user profile includes a user environment configuration, selecting transport protocols based on the user profile, wherein the transport protocols are protocols for transporting information between the server system and the client computer and synchronizing the user environment configuration with a client environment configuration on the client computer. The user profile is portable to other client computers. The method further comprises checking the client computer for compatibility errors before the one or more bundles are installed. The method further comprises monitoring the client computer for errors after the one or more bundles are installed. The method further comprises gathering one or more objects to be included within the one or more bundles. The one or more objects are selected from the group consisting of music, video and game files. The one or more objects include data. The one or more bundles are provided based on a licensing scheme. The services provided within the one or more bundles are paid for by an intermediary who is then paid by a user. The one or more bundles do not comprise selectable components. Alternatively, the one or more bundles comprise selectable components. The method further comprises implementing an interface for selecting the components within the one or more bundles. A double-click adds the one or more bundles to the user profile.

DETAILED DESCRIPTION OF THE PREFERRED EMBODIMENT

The present invention overcomes the issues described above by bundling applications and services together so that users have a much easier time performing the tasks they desire. Applications and services that are typically separate entities are gathered together and bundled in a package so that a user is able to utilize only a few clicks to modify his system into an improved system such as a multimedia system or a telephone system.

Figure 1:
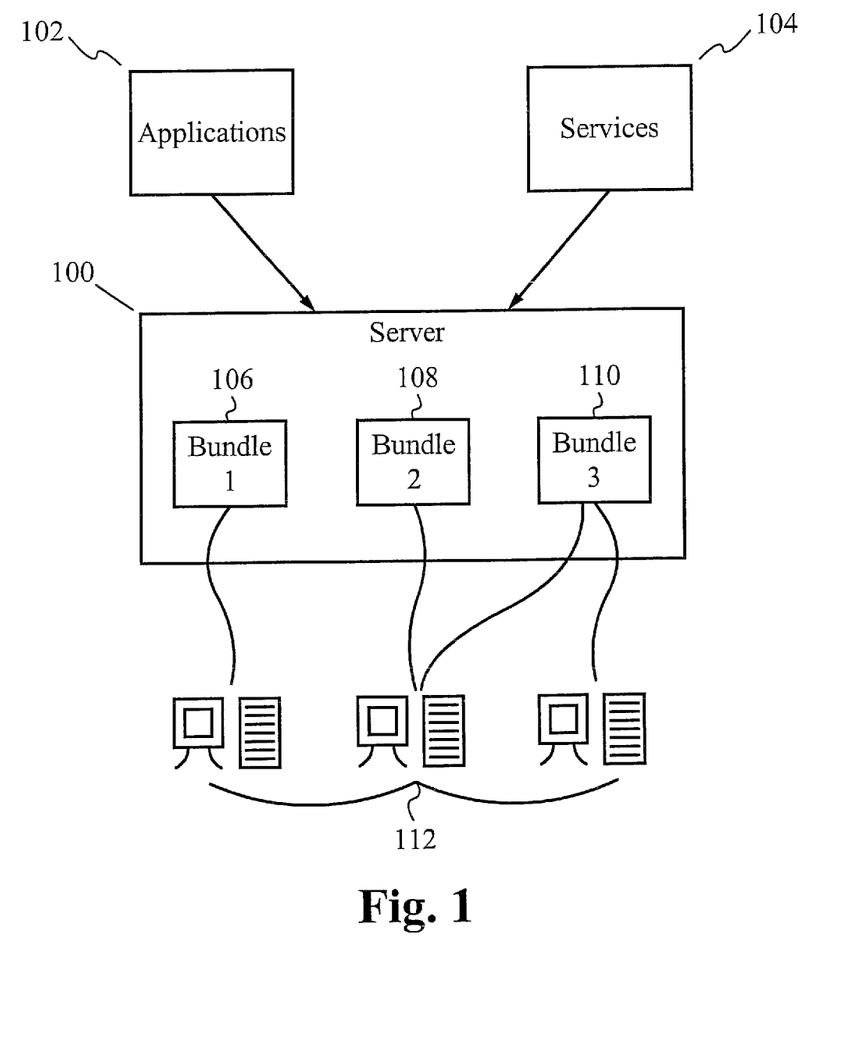
FIG. 1 illustrates a graphical representation of the main components of the preferred embodiment of the present invention.

FIG. 1 illustrates a graphical representation of the main components of the preferred embodiment of the present invention. One or more applications 102 and one or more services 104 are combined to form a bundled package. Other entities are able to be added to the bundle as well such as music or video files. The bundled package is then stored on one or more servers 100. As shown, a first bundle 106, a second bundle 108 and a third bundle 110 are stored within the one or more servers 100.

The number of bundles stored on a server is able to vary as is desired. A user is able to choose to only have a telephone bundle available while another user is able to have numerous bundles available such as multimedia bundles for audio and video, telephone bundles, word processing bundles, photography bundles and other bundles. Furthermore, the bundles are not a set size. For example, if one user decides that they need a basic telephonic service, the bundle will only contain that which is essential for a computing device to function as a telephone such as the Skype™ service and a voice recognition application. However, if a different group wants all of the bells and whistles related to telephone services, the bundle will contain a wide variety of services and applications such as the Skype™ service, a voice recognition application, an address book application, interfaces to email applications and an echo cancellation application. Furthermore, if a user desires to provide different options of the same type of bundle such as the basic telephonic service described above, an intermediate telephone service and the comprehensive service of above, the user is able to have all of the bundles available as separate bundles.

The bundles 106, 108 and 110 stored on the server 100 are then accessible to computing devices 112. Each of the bundles 106, 108 and 110 is accessible by one or more computing devices. Furthermore, a computing device 112 is able to implement one or more bundles. Utilizing the methods described in U.S. patent application Ser. No. 11/144,263, filed on Jun. 2, 2005 and entitled "VIRTUAL APPLICATION MANAGER" which is herein incorporated by reference in its entirety, when a user selects a bundle, the bundle is added to a user's profile. Thereafter, whichever device the user uses on the network, he will be able to access the applications and services of the bundle. To initiate a bundle so that it is added to a user's profile, any standard technique is implemented such as double-clicking an icon or typing an executable filename. The accessibility of the bundle is able to be dependent on a licensing scheme as well. For example, a user decides to access a multimedia bundle on a monthly basis. When the month expires, so does that user's access to that bundle unless a renewal of the bundle was established. Furthermore, where bundles include services that have additional fees, such as a music service where a user has to pay $0.99 for each download of a song, the payment by the user is to the intermediary controlling the bundle. Then the intermediary pays the service company. In other embodiments, there is no intermediary and payment by the user is direct to the service provider.

Figure 2:
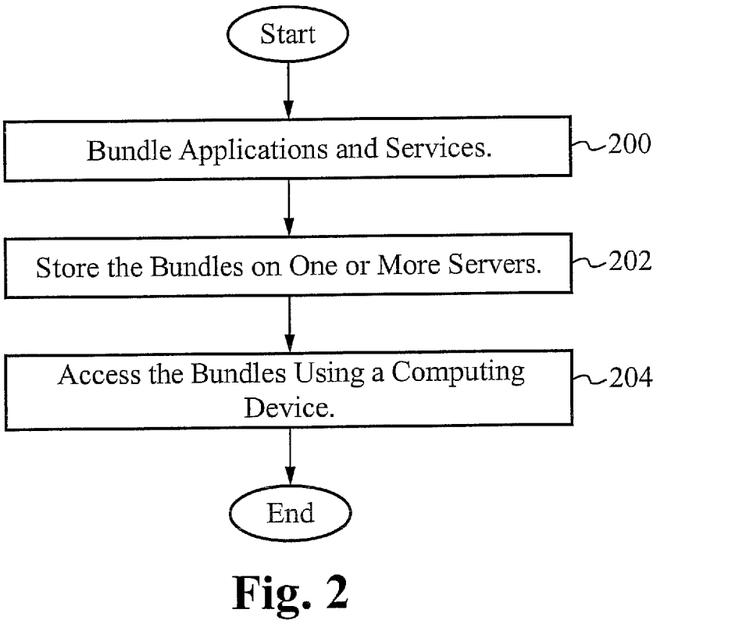
FIG. 2 illustrates a flowchart of the preferred embodiment of the present invention.

FIG. 2 illustrates a flowchart of the preferred embodiment of the present invention. In the step 200, one or more applications and one or more services are bundled together. The one or more applications are any type of application that would be bundled such as a word processing application, voice recognition application, audio/video player or gaming application. The one or more services include those services that are used with other applications to provide a user with a complete experience such as telephony services, music download services and gaming services. In the step 202, the bundles of applications and services are stored on one or more servers. The bundles are accessible by computing devices in the step 204 similar to the applications described in U.S. patent application Ser. No. 11/144,263, filed on Jun. 2, 2005 and entitled "VIRTUAL APPLICATION MANAGER." By providing applications and services in a bundle, a user does not have to spend hours searching for each individual component to set up the system. Everything is bundled together, so a simple click of the mouse is all that is required. Once a user retrieves the desired bundle, it is installed within the user's profile thus making it accessible on that computing device and also any other computing device on the network where the user uses that profile.

Figure 3A:
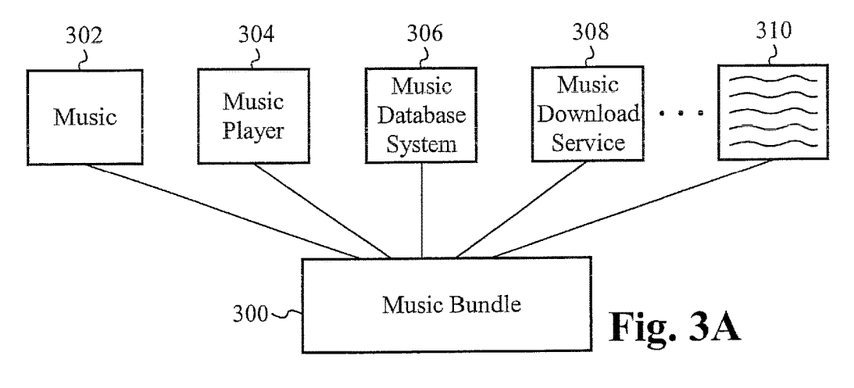
FIGS. 3A-C illustrate exemplary bundles of the preferred embodiment of the present invention.
Figure 3B:
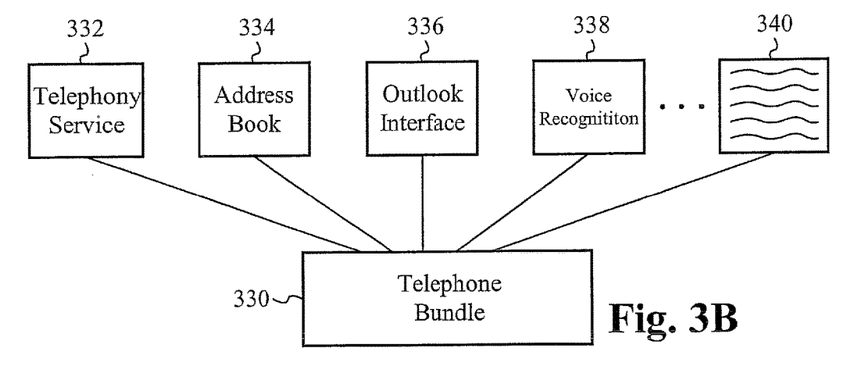
Figure 3C:
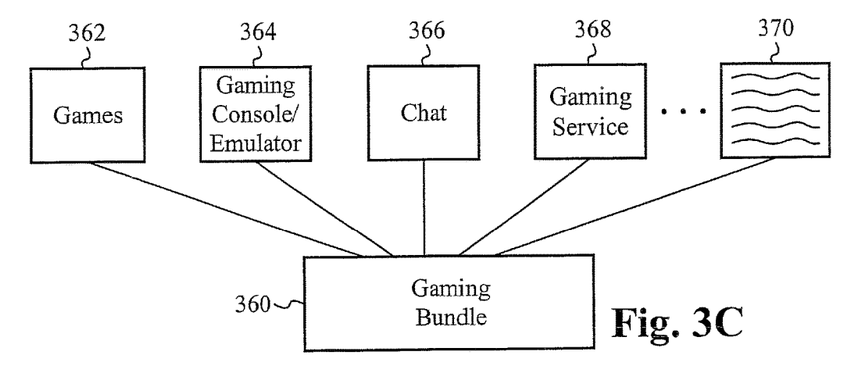

FIGS. 3A-C illustrate exemplary bundles of applications and services. FIG. 3A illustrates a music bundle 300. The music bundle 300 includes those applications and services that are utilized to add functionality of a music system to a user's computer system. In the preferred embodiment, the bundle includes designated elements such as specified music 302, a music player 304, a music database system 306, a music download service 308 and any other necessary music component 310. All of these components are included in the bundle and are added to the user's profile. When users prefer their music bundle to contain playable music 302, it is included. For more streamlined bundles, music 302 is not included within the bundle. To play music whether bundled or acquired later, the music player application 304 is needed. If the user chooses to store his music in a database, one is available in the music database system 306. To be able to download more music in the future, the music download service 308 is necessary.

In other embodiments, the elements within the bundle are selectable. For example, the above bundle is presented to a user including the music 302, the music player 304, the music database system 306, the music download service 308 and the other needed music components 310. However, if a user already has his own music and does not need the music database system 306 nor any additional components 310, he is able to remove those elements from the bundle and only adds the bundle including the music player 304 and music download service 308 to his profile.

In highly configurable embodiments, components are not only selectable as to either include or exclude, but specific choices are able to be made as well. For example, the user is able to specify the music player application 304 as desired such as Winamp or Windows Media® Player. Also, in the configurable bundle, the music download service 308 is able to be designated, so that a user is able to choose iTunes®, Napster™ or something similar. Other components of the bundle are configurable as well.

In other embodiments, the bundles comprise distinguishing features based on customer analysis. For example, there are a number of avid fans of The Beatles, so it is possible for a "Beatles bundle" to include a number of their songs with the music 302, so that the user does not have to spend time retrieving them. Using this system, a plurality of different targeted bundles are available for users, such as providing a Jazz Bundle, a Rock Bundle and an R&B Bundle with popular songs within each bundle. Thus users are able to select a specific bundle that meets their preferences.

FIG. 3B illustrates a telephone bundle 330. The telephone bundle 330 includes applications and services that allow a person to utilize a telephone system on his computing device. Similar to the music bundle 300 described above, the telephone bundle is able to come standard or with configurable options. The benefit of the standard bundle is that someone who knows little or nothing about computer telephony is able to simply click an icon and the system will be set up so that he is able to use the computing device as a telephone. However, a user with more knowledge of computer telephony is able to decide if he would prefer a certain telephony service over another or if certain options are more necessary than others. Included with the telephone bundle is a telephony service 332 such as Skype™ to make the phone calls. An address book 334 is utilized to store phone numbers 334. An interface to Microsoft Outlook® 336 is able to coordinate phone calls with email. A voice recognition application 338 is utilized for receiving a user's voice for the phone calls. Other applications and services 340 are able to be included as necessary such as echo cancellation to allow the computing system to function as a teleconferencing system and not just a phone.

FIG. 3C illustrates a gaming bundle 360. As described above, the gaming bundle 360 is available in standard or configurable editions. The gaming bundle 360 allows users to manage and play games over the Internet. Within the gaming bundle are the actual games 362 to be played in addition to the gaming console/emulator 364 if needed. A chat application 366 is also included to allow users to communicate with each other while gaming. Furthermore, a gaming service 368 which provides users a forum to meet other garners is available. Additional applications and services 370 are also included as needed or desired.

Although specific examples have been described above, there is no limitation on what is able to be bundled. Furthermore, bundles are able to be as large or as small as desired and are able to span multiple categories as well. For example, if it is determined that many users select the same bundles, a bundle will be created to include all of those, such as a teenage bundle which has the music bundle 300, the telephone bundle 330 and the gaming bundle 360 all in one since these are typical uses of a computing device for a teenager.

Figure 4A:
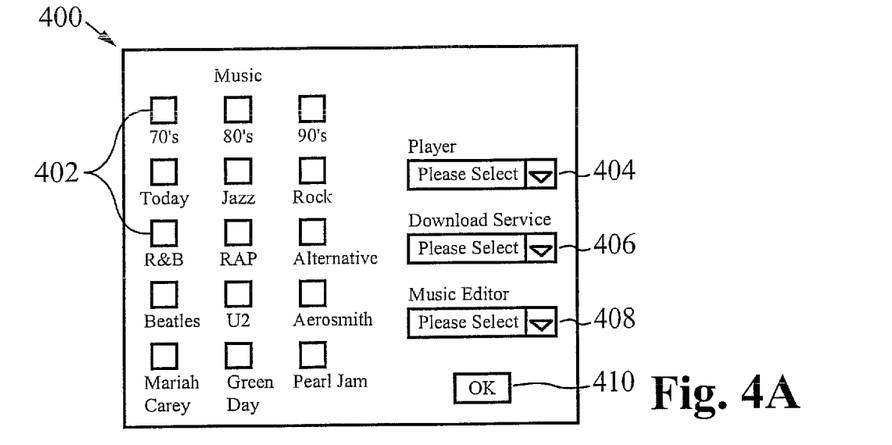
FIGS. 4A-C illustrate an exemplary interface for an embodiment of the present invention.
Figure 4B:
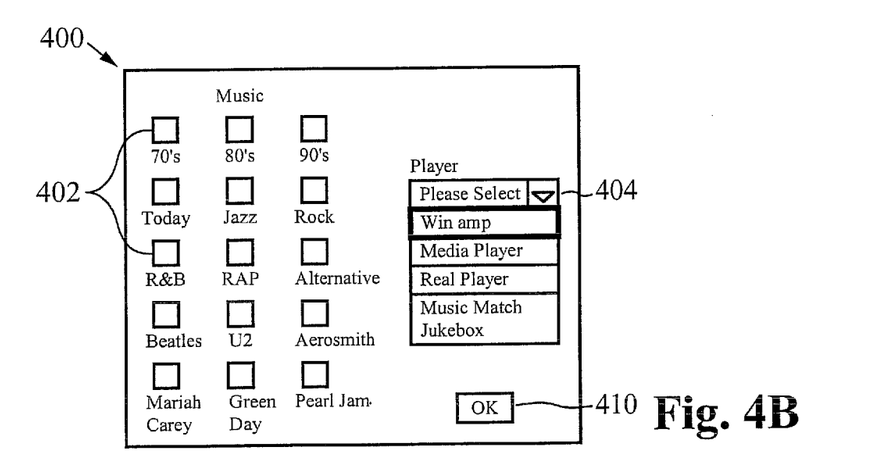
Figure 4C:
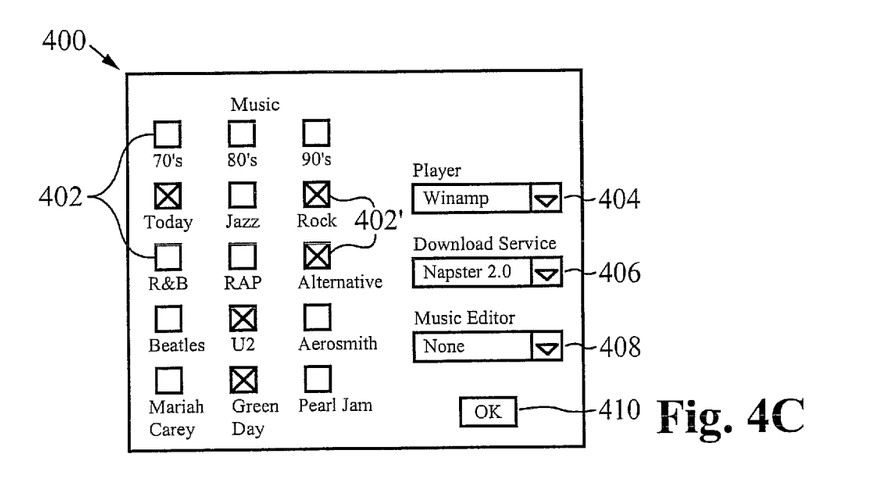

FIGS. 4A-C illustrate an exemplary interface for an embodiment of the present invention. An interface 400 is available in the some embodiments where the bundle is selectable or configurable. The interface 400 allows users to configure the bundle as desired. The interface 400 in FIG. 4A, includes a plurality of check boxes 402 for a user to select which music is included within the bundle. Initially the check boxes 402 are unchecked as no music is selected. Without additional music included, the bundle is very streamlined and preferable for slower networks. Drop-down menus are utilized to permit a user to select a music player 404, a music download service 406 and a music editor 408. Although check boxes are used for the music and drop-down menus are implemented for the other selections, any type of input is able to be used. For instance, check boxes are able to be used for music download services as well, so a user is able to have multiple services available in the bundle. FIG. 4B shows a user selecting from the player 404 drop-down menu. The user selected "Winamp." The user utilizes the other drop-down menus in a similar fashion to select the download service 406 and the music editor 408. FIG. 4C, shows a completed interface 400 where music represented by checked check boxes 402' will be included within the bundle. Furthermore, the selections of the music player 404, download service 406 and music editor 408 are completed. When the user is satisfied with his selections, he clicks an OK button 410 and the bundle is added to his profile and installed and thus the applications and services within are available for use.

When dealing with bundles of applications and services there are concerns with compatibility. However, when the present invention is utilized with the diagnostics systems described in U.S. patent application Ser. No. 11/440,563, filed on May 24, 2006 and entitled "COMPUTER HARDWARE AND SOFTWARE DIAGNOSTIC AND REPORT SYSTEM" and U.S. patent application Ser. No. 11/368,212, filed on Mar. 2, 2006 and entitled "PRE-INSTALL COMPLIANCE SYSTEM" which are hereby incorporated by reference, which are running in the background, such compatibility conflicts are avoided or remediated very quickly.

Figure 5:
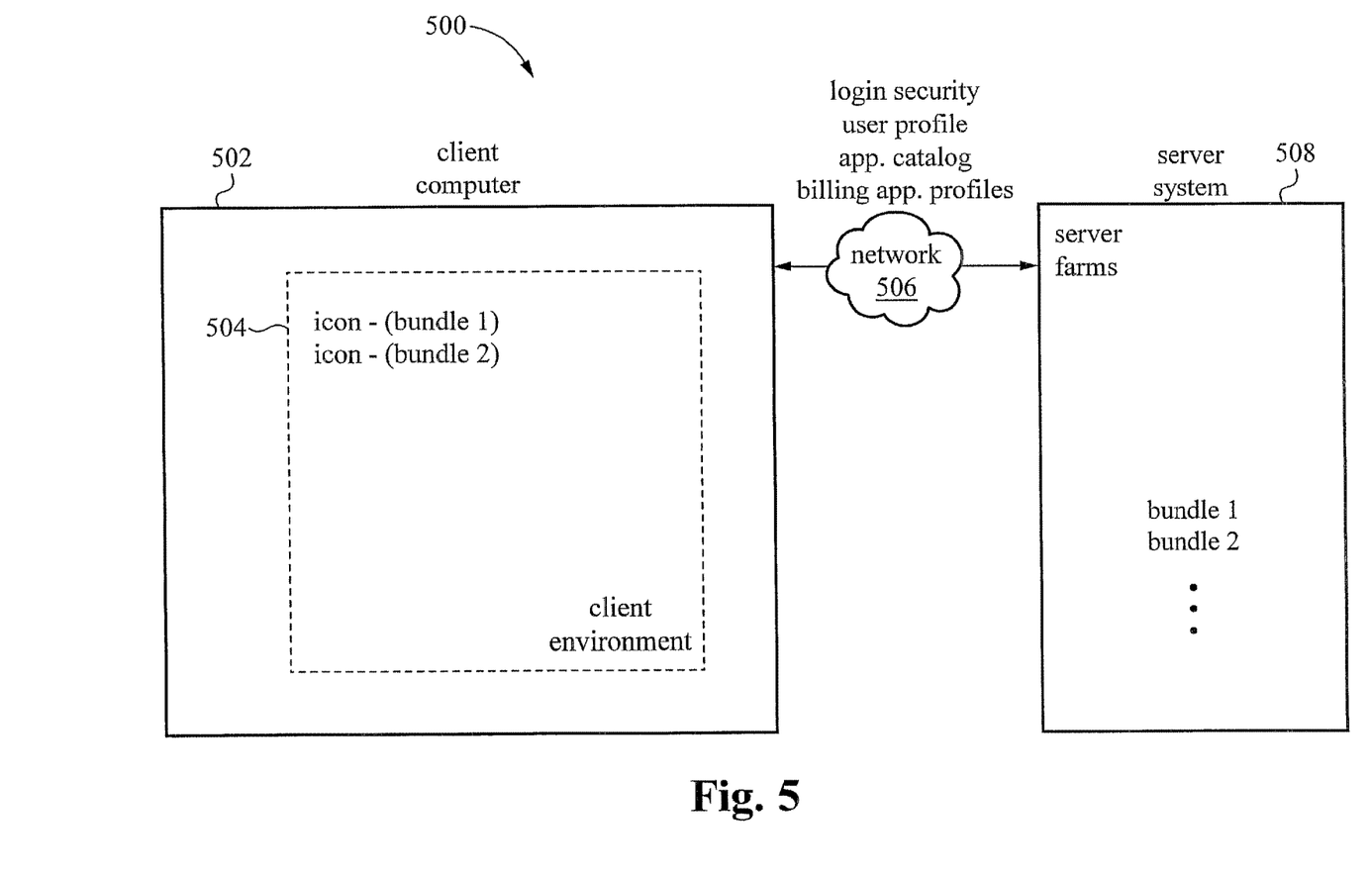
FIG. 5 illustrates a graphical representation of a virtual bundle manager (VBM).

FIG. 5 is a graphical representation of a virtual bundle manager (VBM) 500 which is able to be used in conjunction with the application/service bundle described herein. The VBM 500 is a group of technologies that enable a client computer 502 and other personal computing hardware devices to execute software installed and maintained on a remote server system 508. The client computer 502 includes a client environment 504, which is a graphical interface on a display device that allows the user to interact with the VBM 500. A user is able to define certain preferences of the client environment 504. These preferences define icons, links, colors, fonts, and other characteristics to be displayed on the display device. The client environment 504 is preferably a desktop environment, a thin client environment, a laptop environment, a personal digital assistant environment, a palmtop environment, a workstation environment, or other type of environment suitable for user interaction. The client environment 504 is stored as a user environment configuration on the server system 508. The user environment configuration is part of the user profile for the particular user.

User profiles follow a user at network login and allow the user to run the same software and services defined in his user profile on different hardware devices. The server system 508 maintains login security, application/service bundle catalogs, billing information for each user, and application/service bundle profiles. This information, maintained at a central location, increases user flexibility and mobility by eliminating reliance on a single personal hardware device. Application and service bundles are installed and maintained at a central server system 508 and are able to be utilized at an almost unlimited number of network locations having client computers 502.

The VBM 500 maintains an application environment, providing fast installation distribution to remote end-user hardware devices, such as a client computer 502. Each user has an account and a user profile. The user profile is centrally located on a central server system 508. The server system 508 maintains the user profile, which includes a list of applications and services to which the user is subscribed and authorized, the user's local preferences for each application and service, the client environment 504, and configuration of the local hardware and operating system. Such remote maintenance allows a user to move to different hardware platforms and operating environments without re-installing applications.

The VBM 500 supports multiple server and network technologies that allow an application and service bundle to appear to be installed locally. However, the bundle is not necessarily installed locally. The bundle is able to be installed locally at the client computer 502, installed locally with the code hosted and stored remotely on the server system 508, or stored and executed on the remote server system 508 over a network 506.

Figure 6:
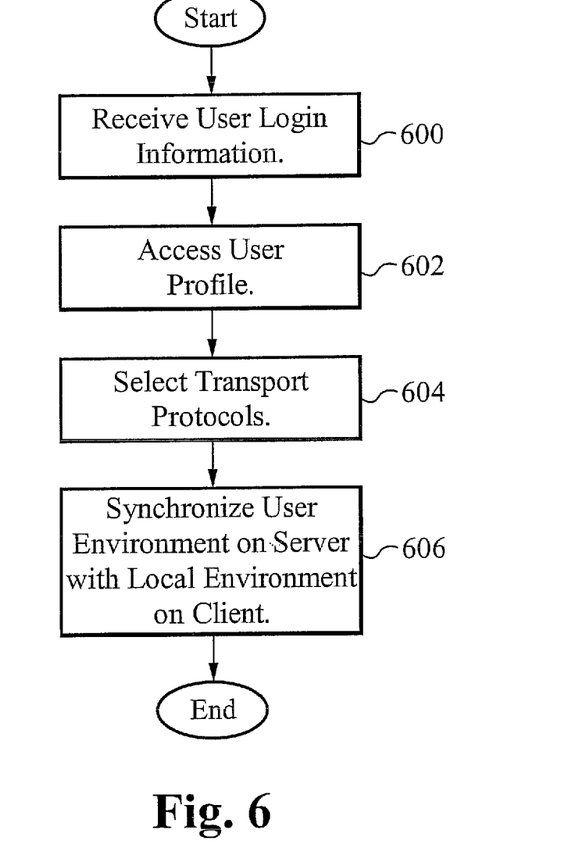
FIG. 6 illustrates a flowchart of a user environment maintenance process of the VBM

FIG. 6 is a flowchart of a user environment maintenance process of the VBM 500, in accordance with the present invention. A user initially logs into the VBM 500. Accordingly, in the step 600, the VBM 500 receives user login information input by a user. Such login information may contain, for example, a username and a password. Each user account has an associated user profile. In the step 602, the user profile is accessed using the login information. The user profile includes, among other things, a list of installed application/service bundles. The user profile is editable by the user. Moving to the step 604, the VBM 500 selects the appropriate transport protocols or network access methods based on the user profile and parameters initially defined by the central administrator's installation selection. Each of the network access methods support server based remote hosted application storage or server based application execution. Accordingly, moving from one client to a different client is a rapid process because transferring the application/service code from the server system 508 to the different client is not required. Then, in the step 606, the manager synchronizes the user environment configuration on the server system 508 with the client environment on the client computer 502. In an alternative embodiment, the step of synchronization takes place at a time other than during the time of login. For example, the user may input a request to perform synchronization procedures at another convenient time while the user is logged into the VBM 500.

To utilize the present invention, related applications and services are combined into a bundle so that a user is able to easily implement the desired function of the applications and services. The bundle is stored on a server which is accessible by a user's computing device. The user then adds the bundle to the user's profile, so that it is accessible on any computing device on the network when his profile is initiated. The bundle provides applications and services at the click of a button or two instead of requiring searching throughout the Internet. In embodiments where the bundle is pre-configured such that set components are included, the user has no ability to modify the bundle, but the process of installation is extremely simple. Installation would comprise a single click or double-click of the mouse. In embodiments where the bundle is pre-configured with some required base components and some optional components, the user has a little flexibility while the process of installation remains very easy. Installation would comprise a few more clicks of the mouse to select or de-select items. In embodiments, where the bundle is highly configurable, the user is able to determine which components are included with further specificity such as which exact application or service is used. Installation comprises more clicks of the mouse to select or de-select items, but the process would still be relatively easy. By using the bundle instead of retrieving each separate application and service independently, the user is able to save time and effort. Furthermore, with the background diagnostic monitoring, the user is able to install the bundle without a significant concern of compatibility issues because if any exist they should be detected and remediated quickly.

In operation, the present invention enables a user to easily configure his computing device as a system of numerous components including applications and services. A bundle of applications and services is easily added to a user's profile so that when the user accesses his computing device on the network, the applications and services which work together to perform a specific task are readily available. For example, music files and music-related applications such as a music player, an editor and an organizer are combined with a music download service to provide the user with a music jukebox. Additionally, a video bundle could be added to the system as well to generate a multimedia station. Thus, users are able to turn their computing devices into a "do whatever I want" device by implementing the bundles of the present invention. Furthermore, since the installation is to a user's profile and not simply to a dedicated machine, the user is easily able to access these improvements from any device on the network. For example, a user has his work computer coupled to the network, his car includes a system with capabilities of accessing the network and his home computer is also coupled to the network. If the user implements a music bundle at home, he is also able to listen to that music in the car and at work. There are similar implications for video as well which will be accessible via computing devices at home, work, in the car and other more remote places as long as the computing device is able to couple to the network.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of bundling applications and services comprising:
    gathering one or more applications;
    gathering one or more services;
    associating a combination of at least one of the one or more applications and at least one of the one or more services, the at least one of the one or more applications being functionally interdependent with the at least one of the one or more services and the at least one of the one or more services providing a service corresponding to the at least one of the one or more applications which facilitates use of the at least one of the one or more services from a user device;
    bundling the combination of the at least one of the one or more applications and at least one of the one or more services as a bundle, wherein the bundle is accessible on one or more servers and is added to a user profile when selected from a computing device, wherein the bundle is accessible through the user profile from any computing device which has access to the one or more servers.

2. The method as claimed in claim 1 further comprising installing the bundle on the computing device.

3. The method as claimed in claim 1 further comprising checking the computing device for compatibility errors between the applications and the services within the bundle and the computing device before the bundle is installed.

4. The method as claimed in claim 1 further comprising monitoring a the computing device for errors after the bundle is installed.

5. The method as claimed in claim 1 further comprising gathering one or more objects to be included within the bundle.

6. The method as claimed in claim 5 wherein the one or more objects are selected from the group consisting of music, video and game files.

7. The method as claimed in claim 5 wherein the one or more objects include data.

8. The method as claimed in claim 1 wherein the bundle is provided based on a licensing scheme.

9. The method as claimed in claim 1 wherein the services provided within the bundle are paid for by an intermediary who is then paid by a user.

10. The method as claimed in claim 1 wherein the bundle does not comprise selectable components.

11. The method as claimed in claim 10 further comprising implementing an interface for selecting the components within the bundle.

12. The method as claimed in claim 1 wherein the bundle comprises selectable components.

13. The method as claimed in claim 1 wherein a double-click adds the bundle to the user profile.

14. A system for utilizing a bundle to install applications and services comprising:
one or more servers for storing the bundle, wherein the bundle contains a combination of at least one of one or more applications and at least one of one or more services associated with a bundle feature provided by the servers, the at least one of the one or more applications being functionally interdependent with the at least one of the one or more services and the at least one of the one or more applications enabling the use of the at least one of the one or more services;
at least one of the servers providing a selection feature that enables simultaneous selection of all of the applications and the services within the bundle by selecting the bundle;
a computing device coupled to the one or more servers for receiving the bundle through a profile, wherein the bundle is accessible through the profile from any computing device which has access to the one or more servers.

15. The system as claimed in claim 14 further comprising a diagnostic system for checking the computing device for compatibility errors between the applications and the services within the bundle and the computing device before the bundle is installed.

16. The system as claimed in claim 14 further comprising a diagnostic system for monitoring the computing device for errors after the bundle is installed.

17. The system as claimed in claim 14 wherein the bundle further comprises one or more objects.

18. The system as claimed in claim 17 wherein the one or more objects are selected from the group consisting of music, video and game files.

19. The system as claimed in claim 17 wherein the one or more objects include data.

20. The system as claimed in claim 14 further comprising a licensing scheme for limiting the duration of use of the applications and services within the bundle.

21. The system as claimed in claim 14 wherein the services provided within the bundle are paid for by an intermediary who is then paid by a user.

22. The system as claimed in claim 14 wherein the bundle does not comprise selectable components.

23. The system as claimed in claim 14 wherein the bundle comprises selectable components.

24. The system as claimed in claim 23 further comprising an interface implemented for selecting the components within the bundle.

25. The system as claimed in claim 14 wherein a double-click adds the bundle to the profile.

* * * * *